(12) United States Patent
Karino

(10) Patent No.: US 6,738,413 B1
(45) Date of Patent: May 18, 2004

(54) CODE GENERATOR, COMMUNICATION UNIT USING THE CODE GENERATOR, COMMUNICATION SYSTEM, AND CODE GENERATION METHOD

(75) Inventor: Shingo Karino, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/557,422

(22) Filed: Apr. 21, 2000

(30) Foreign Application Priority Data

Apr. 21, 1999 (JP) .......................................... 11-113705

(51) Int. Cl.[7] ............................................... H04B 1/69
(52) U.S. Cl. ...................................................... 375/130
(58) Field of Search ................................. 375/308, 329, 375/130; 332/103; 329/304; 327/341, 164; 364/713

(56) References Cited

U.S. PATENT DOCUMENTS

| 4,583,231 | A | | 4/1986 | Puckette |
| 5,434,807 | A | | 7/1995 | Yoshida |
| 5,751,761 | A | | 5/1998 | Gilhousen |
| 5,796,776 | A | | 8/1998 | Lomp et al. |
| 5,835,030 | A | * | 11/1998 | Tsutsui et al. ................. 341/51 |
| 5,931,893 | A | * | 8/1999 | Dent et al. ................... 708/422 |
| 5,969,650 | A | * | 10/1999 | Wilson .......................... 341/67 |
| 5,991,332 | A | | 11/1999 | Lomp et al. |
| 6,366,938 | B1 | * | 4/2002 | Levison et al. .............. 708/422 |
| 6,400,753 | B1 | * | 6/2002 | Kohli et al. ................. 375/134 |
| 6,459,722 | B2 | * | 10/2002 | Sriram et al. ............... 375/130 |
| 6,496,920 | B1 | * | 12/2002 | Zou et al. ..................... 712/33 |
| 6,513,139 | B2 | * | 1/2003 | Gray ........................... 714/771 |

FOREIGN PATENT DOCUMENTS

EP 0 680 172 A2 11/1995
JP 7-107006 4/1995

OTHER PUBLICATIONS

M.Y. Hsiao, "Generating Pseudo Noise Sequences", Sep. 4, 1968, IBM Technical Disclosure Bulletin, XP–002245505, 2 pages.
Patent Abstracts of Japan Publication No. 04057407, dated Feb. 25, 2002, "Parallel Generating Circuit for Serial PN Patterns and Configuration Method for Said Circuit", 1 page.

* cited by examiner

*Primary Examiner*—Tesfaldet Bocure
*Assistant Examiner*—Qutub Ghulamali
(74) *Attorney, Agent, or Firm*—Pearne & Gordon LLP

(57) ABSTRACT

A code generator capable of performing the shift operation at high speed on a small circuit scale by providing combination circuits (matrix operation weights) in response to the shift count. The code generator has a register 10, a selection circuit 11, combination circuits 12 to 16 for performing matrix operation, and a control circuit 17 for controlling the timing of storing data in the selection circuit 11 and the register 10. One of the combination circuits 12 to 16 is selected in response to a select signal S from the control circuit 17 and data is output from the register 10 in response to a register storage clock Rck.

14 Claims, 11 Drawing Sheets

FIG. 5A UNIT MATRIX OPERATION $$x^{(0)} = \begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

FIG. 5B NATURAL BINARY NUMBER MATRIX OPERATION WITH WEIGHT 1

$$x^{(1)} = \begin{bmatrix} 1 & 0 & 0 & 0 \\ 0 & 0 & 0 & 1 \\ 0 & 0 & 1 & 0 \\ 1 & 1 & 0 & 0 \end{bmatrix}$$

FIG. 5C NATURAL BINARY NUMBER MATRIX OPERATION WITH WEIGHT 2

$$x^{(2)} = x^{(1)} \cdot x^{(1)} = \begin{bmatrix} 1 & 0 & 0 & 0 \\ 0 & 0 & 0 & 1 \\ 0 & 0 & 1 & 0 \\ 1 & 1 & 0 & 0 \end{bmatrix} = \begin{bmatrix} 1 & 1 & 0 & 0 \\ 1 & 0 & 0 & 0 \\ 0 & 0 & 0 & 1 \\ 1 & 1 & 1 & 0 \end{bmatrix}$$

FIG. 5D NATURAL BINARY NUMBER MATRIX OPERATION WITH WEIGHT 4

$$x^{(4)} = x^{(2)} \cdot x^{(2)} = \begin{bmatrix} 1 & 1 & 0 & 0 \\ 1 & 0 & 0 & 0 \\ 0 & 0 & 0 & 1 \\ 1 & 1 & 1 & 0 \end{bmatrix} = \begin{bmatrix} 1 & 1 & 1 & 1 \\ 1 & 1 & 1 & 0 \\ 1 & 1 & 0 & 0 \\ 0 & 1 & 1 & 1 \end{bmatrix}$$

FIG. 5E NATURAL BINARY NUMBER MATRIX OPERATION WITH WEIGHT 8

$$x^{(8)} = x^{(4)} \cdot x^{(4)} = \begin{bmatrix} 1 & 1 & 1 & 1 \\ 1 & 1 & 1 & 0 \\ 1 & 1 & 0 & 0 \\ 0 & 1 & 1 & 1 \end{bmatrix} = \begin{bmatrix} 1 & 0 & 1 & 0 \\ 0 & 1 & 0 & 1 \\ 1 & 0 & 1 & 1 \\ 1 & 1 & 0 & 1 \end{bmatrix}$$

CODE GENERATOR, COMMUNICATION UNIT USING THE CODE GENERATOR, COMMUNICATION SYSTEM, AND CODE GENERATION METHOD

BACKGROUND OF THE INVENTION

This invention relates to a code generator capable of executing a phase shift of a PN (pseudo noise) sequence for generating an arbitrary phase shift amount, a communication unit using the code generator, and a code generation method. More particularly, the invention relates to a code generator capable of generating an arbitrary phase shift amount without performing cyclic shift operation, a communication unit using the code generator, and a code generation method.

Hitherto, in a spread spectrum communication system, it has been necessary to calculate the phase shift amount of a PN sequence at high speed. Then, as a calculation method of the phase shift amount of a PN sequence in a related art, the cyclic shift operation and matrix operation have been executed in combination.

FIG. 11 is a drawing to show a code generator in a related art. In FIG. 11, the code generator comprises shift registers 1111 to 1114 for receiving data (bit data) from the preceding stage and shifting the data to the following stage, feedback taps 1115 being placed between the shift registers 1111 and 1112 and between the shift register 1111 and the output of the shift register 1114, and a NOR circuit 1110 for exclusively ORing data from the feedback taps 1115.

Thus, in the code generator in the related art, the structure of a generated PN sequence is determined by the number of stages of the shift registers and the positional relationship of the feedback taps, as shown in FIG. 11. Data with four bits other than "0" is stored in each register as an initial state, then the shift registers 1111 to 1114 are cyclically shifted, whereby the PN sequence is generated.

Here, the cyclic shift operation can be represented by matrix operation. That is, the data in the initial state is stored in each shift register 1111 to 1114 and the shift registers 1111 to 1114 are cyclically shifted, then the value stored in each shift register 1111 to 1114 can be found by performing determinant operation. For example, letting the number of times the cyclic shift operation is performed be N, the value of each register in the initial state be A, and determinant be X(N), shift register value B after the cyclic shift operation can be found by the following equation.

$$B = X(N)A$$

As shown above, the code generator in the related art generates PN sequence output of an arbitrary phase shift amount by performing the cyclic shift operation and operation of a specific shift amount in the combination circuit in combination.

However, the code generator in the related art as shown in FIG. 11 generates an arbitrary phase shift amount by using the matrix operation combination circuit and the cyclic shift operation of the shift register in combination, thus the circuit scale of the matrix operation combination circuit grows to perform the shift operation at high speed; this is a problem.

On the other hand, if the circuit scale is lessened, the cyclic shift operation needs to be performed more times, thus the operation of the code generator becomes low-speed operation; this is a problem.

SUMMARY OF THE INVENTION

It is therefore an object of the invention to provide a code generator capable of performing the shift operation at high speed on a small circuit scale, a communication unit using the code generator, and a code generation method.

To the end, according to a first aspect of the invention, there is provided a code generator for generating code data responsive to an arbitrary phase shift amount, the code generator comprising storage means for storing an initial value or an operation value of the code data, a plurality of matrix operation means each for performing matrix operation with a weight responsive to a predetermined phase shift amount, unit matrix operation means for performing unit matrix operation, selection means being connected between the storage means and the plurality of matrix operation means and the unit matrix operation means for selecting one of the plurality of matrix operation means or the unit matrix operation means, and control means for controlling the selection means and the storage means, characterized in that the selection means selects one of the plurality of matrix operation means or the unit matrix operation means in response to a selection signal from the control means and connects the selected operation means to the storage means, and that the storage means outputs the stored data in response to a storage signal from the control means.

Combination circuits (matrix operation weights) are provided in response to the shift count, whereby it is made possible to perform arbitrary phase shift amount calculation of a PN sequence at high speed on a small and compact circuit scale.

To the end, according to a second aspect of the invention, there is provided a code generator for generating code data responsive to an arbitrary phase shift amount, the code generator comprising storage means for storing an initial value or an operation value of the code data, a plurality of matrix operation means each for performing matrix operation with a weight responsive to a predetermined phase shift amount, selection means being connected between the storage means and the plurality of matrix operation means for selecting one of the plurality of matrix operation means, and control means for controlling the selection means and the storage means, characterized in that the selection means selects one of the plurality of matrix operation means in response to a selection signal from the control means and connects the selected matrix operation means to the storage means, and that the storage means outputs the stored data in response to a storage signal from the control means.

Since output of the register is controlled in response to the bit of the phase shift amount, the shift operation can be performed at high speed on a smaller circuit scale.

In the code generator, the control means may generate the storage signal in response to the arbitrary phase shift amount. At this time, the control means may generate the selection signal in response to the arbitrary phase shift amount. Further, the control means can also output the storage signal after outputting the selection signal. The matrix operation means may perform the matrix operation with the value corresponding to a predetermined code position, of the code string provided by binarizing the arbitrary phase shift amount as the matrix operation weight. Further, the storage means can also comprise a plurality of storage elements each for storing one-bit data.

The code generator can be applied to a communication unit comprising reception means for processing a reception signal and transmission means for processing a transmission signal. A plurality of the reception means and the transmission means are provided for each predetermined frequency band of the signals to be processed and the reception means and the transmission means for processing the signals on the same frequency band can also use the same code generator. Further, the communication unit can be applied to a communication system for transmitting and receiving data.

Since the communication unit uses the code generator provided with the combination circuits (matrix operation weights) in response to the shift count, the shift operation can be performed at high speed on a small circuit scale, and the communication unit can be made more compact with high performance.

To the end, according to a third aspect of the invention, there is provided a code generation method for generating code data responsive to an arbitrary phase shift amount, the code generation method comprising the steps of storing data, executing a count in response to the number of clocks, selecting one bit of a binary bit string of the arbitrary phase shift amount in order starting at the least or most significant bit for each count, generating a selection signal in response to the value of the selected bit, performing the matrix operation responsive to the selection signal on the stored data, and replacing the stored data with the operation result data.

To the end, according to a fourth aspect of the invention, there is provided a code generation method for generating code data responsive to an arbitrary phase shift amount, the code generation method comprising the steps of storing data, executing a count in response to the number of clocks, selecting one bit of a binary bit string of the arbitrary phase shift amount in order starting at the least or most significant bit for each count, generating a selection signal and a storage signal in response to the value of the selected bit, determining the matrix operation responsive to the selection signal, determining whether or not the matrix operation responsive to the selection signal is to be performed on the stored data based on the storage signal, and if the matrix operation is performed on the data, replacing the stored data with the operation result data.

At this time, the steps of the step of executing a count in response to the number of clocks to the step of replacing the stored data with the operation result data may be repeated until processing is performed for all bits of the binary bit string of the arbitrary phase shift amount.

BRIEF DESCRIPTION OF THE DRAWINGS

FIG. 5 is a drawing to show operation matrixes of combination circuits in the invention;

DETAILED DESCRIPTION OF THE DRAWINGS

Figure 1:
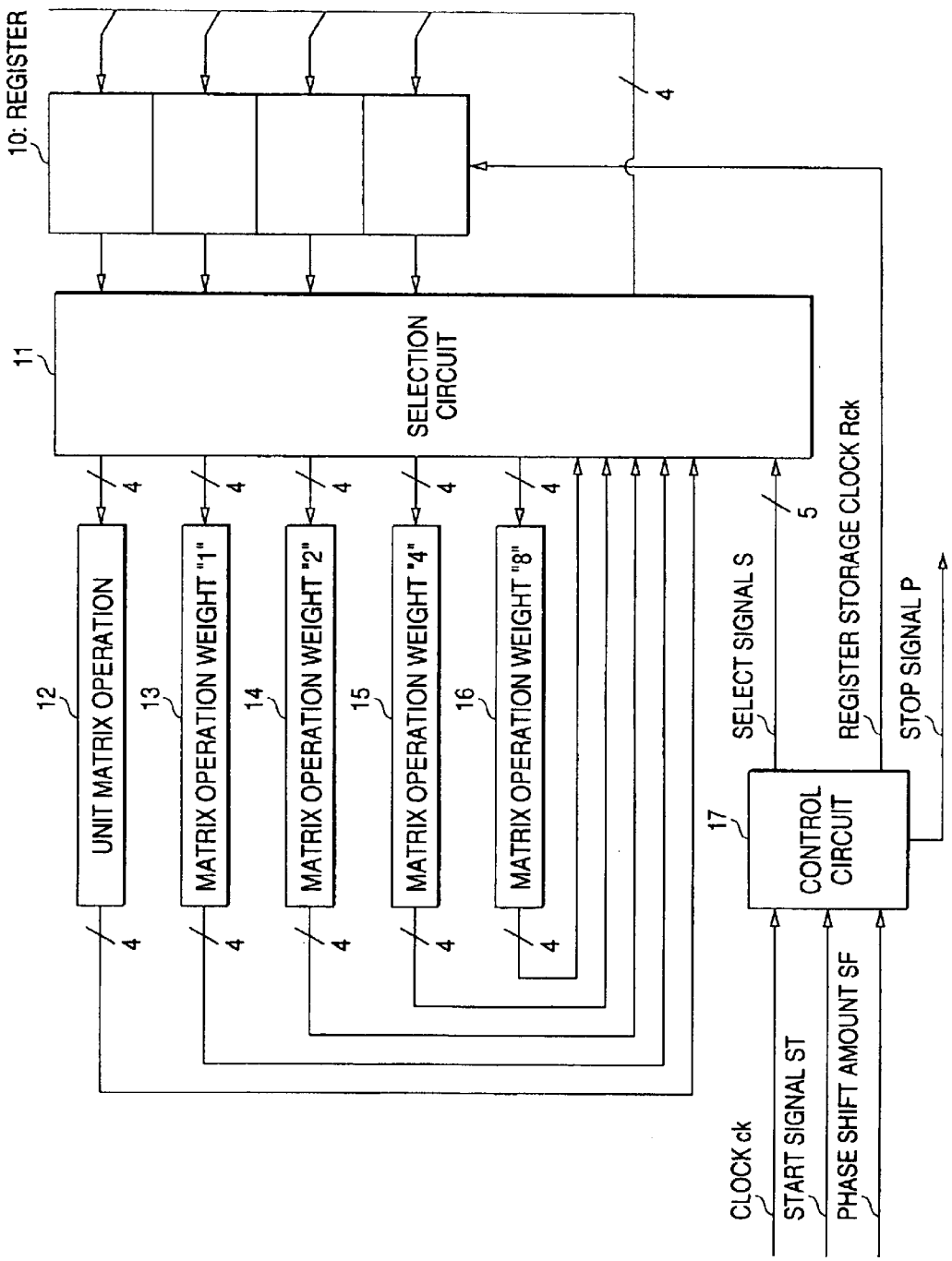
FIG. 1 is a drawing to show the configuration of a code generator in the invention.

Referring now to the accompanying drawings, there are shown a code generator of the invention, a communication unit using the code generator, and a code generation method.
First Embodiment FIG. 1 is a drawing to show the configuration of a code generator of the invention. In FIG. 1, the code generator comprises a register 10 for temporarily holding data, a selection circuit 11 for selecting data from the register 10 and determining the output destination of the data, a combination circuit 12 for performing unit matrix operation, a combination circuit 13 for performing matrix operation of shift operation "1 (=$2^0$)" (matrix operation weight "1"), a combination circuit 14 for performing matrix operation of shift operation "2 (=$2^1$)" (matrix operation weight "2"), a combination circuit 15 for performing matrix operation of shift operation "4 (=$2^2$)" (matrix operation weight "4"), a combination circuit 16 for performing matrix operation of shift operation "8 (=$2^3$)" (matrix operation weight "8"), and a control circuit 17 for controlling the timing of storing data in the selection circuit 11 and the register 10.

Figure 2:
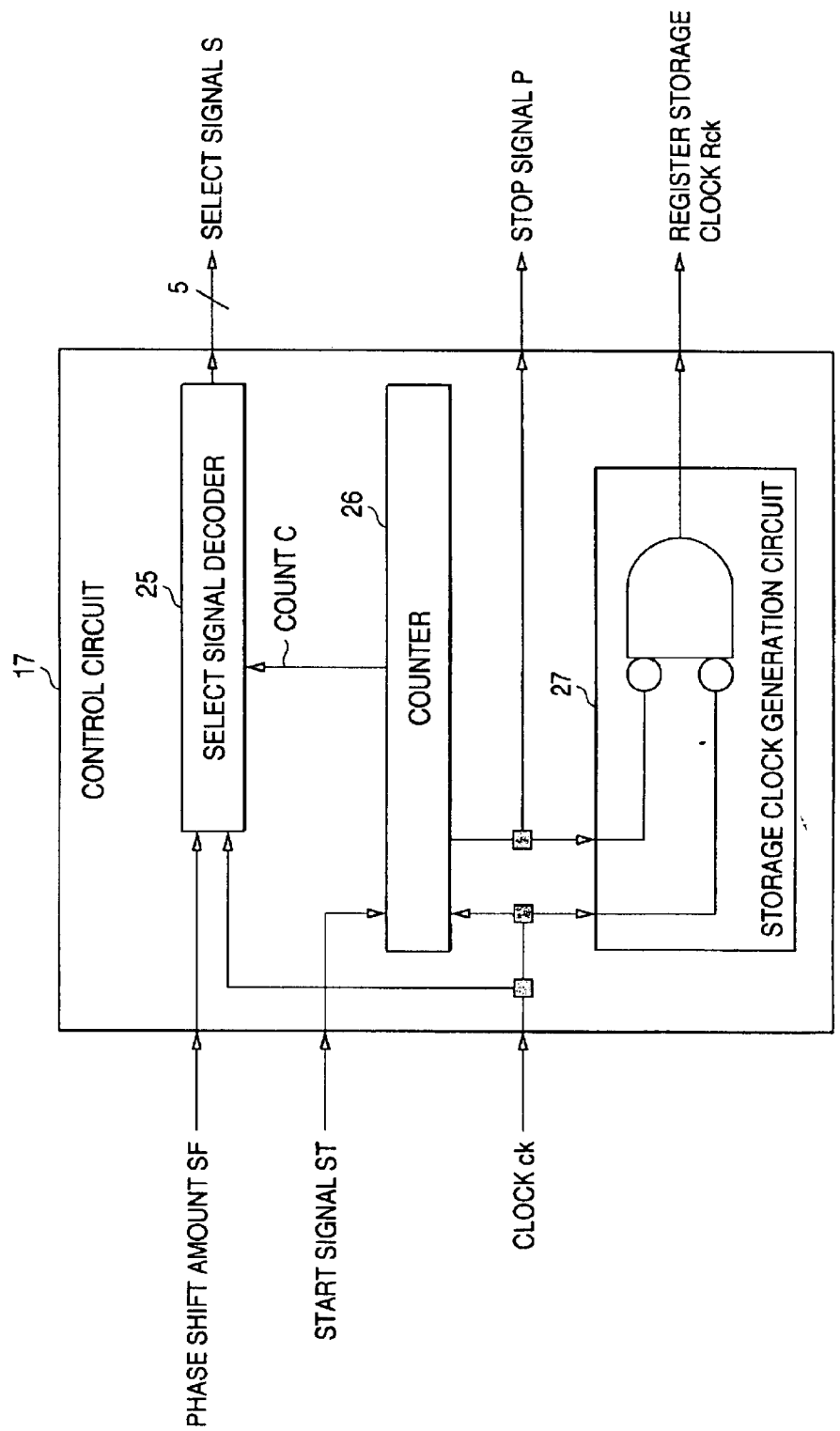
FIG. 2 is a drawing to show the configuration of a control circuit in the invention.

FIG. 2 is a drawing to show the configuration of the control circuit 17. The control circuit 17 comprises a counter 26 for counting clock ck in response to input of a start signal ST and outputting a clock ck count C and a stop signal P, a storage clock generation circuit 27 for inverting the clock ck and the stop signal P from the counter 26 and outputting the logical product of the inverted clock and signal as a register storage clock Rck, and a select signal decoder 25 for outputting a select signal S based on a phase shift amount SF, the clock ck, and the count C from the counter 26.

Figure 3:
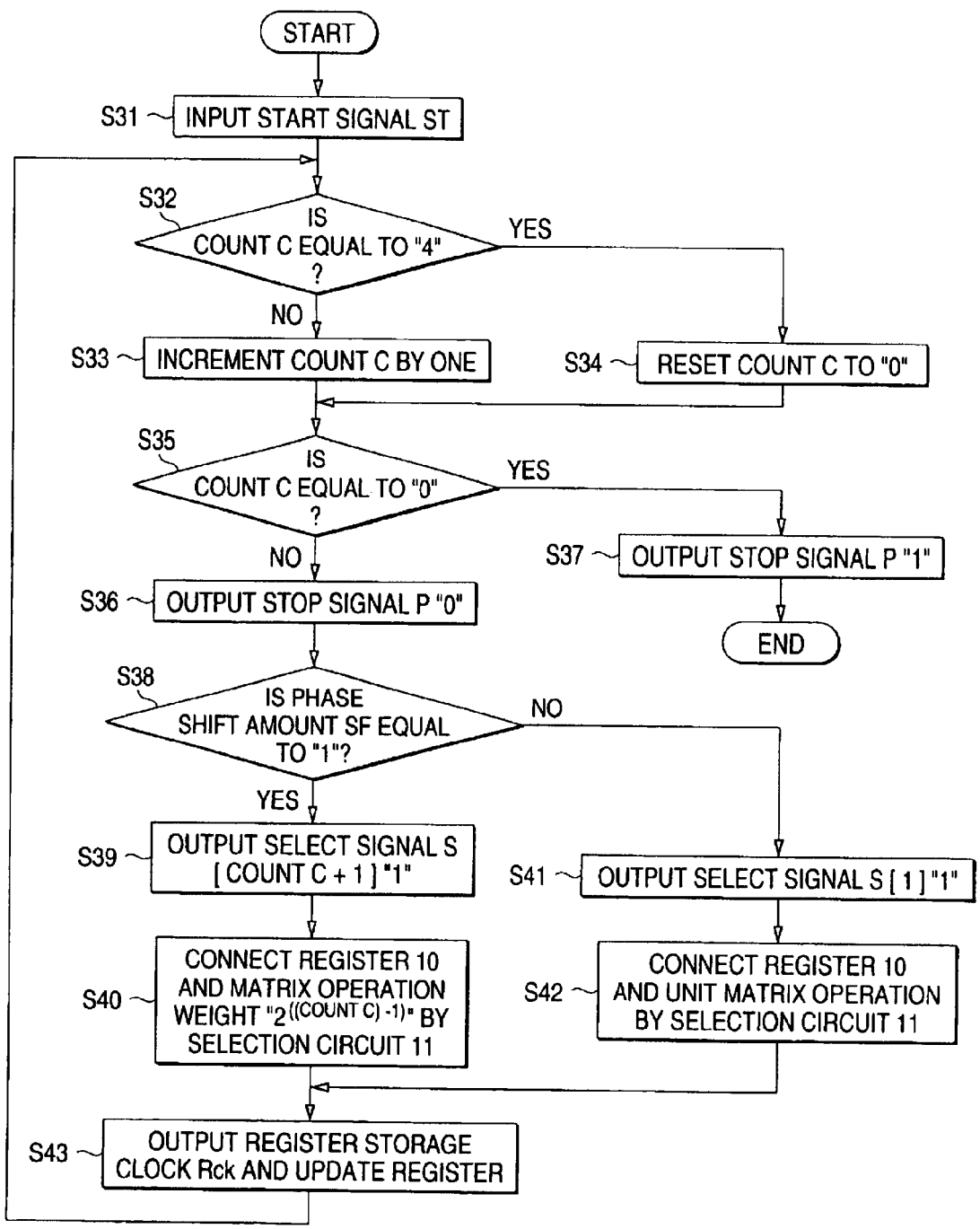
FIG. 3 is a flowchart to show the operation of the code generator in the invention.
Figure 4:
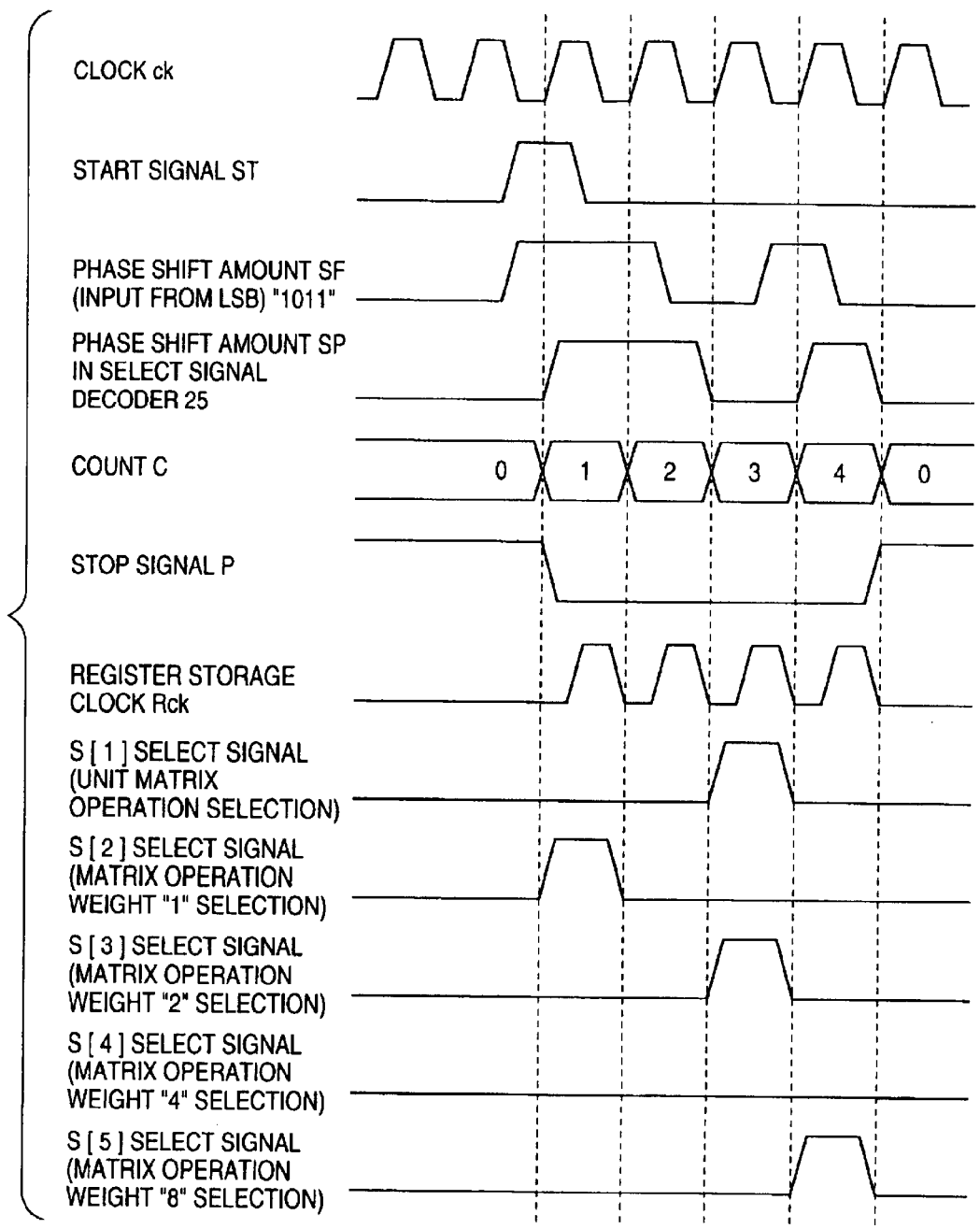
FIG. 4 is a time chart to show the operation of the code generator in the invention.

FIG. 3 is a flowchart to show the operation of the code generator previously described with reference to FIGS. 1 and 2. FIG. 4 is an operation timing chart of the code generator previously described with reference to FIGS. 1 and 2.

The operation of the code generator of the invention will be discussed. As an example of generating (outputting) a PN sequence, X4+X3+1 with degree 4 is taken, and the operation with the phase shift count 11 (binary bit string: 1011) is performed.

First, initial data is stored in the register 10. Next, a start signal ST is input to the counter 26 of the control circuit 17 at step S31.

When the start signal ST is input, the counter 26 inputs the phase shift count 11 (binary bit string: 1011) in order starting at the least significant bit of the binary number every clock ck as input of the phase shift amount SF of the control circuit 17, and outputs a stop signal P (S32–S37).

For example, the first count C of the counter 26 is "0" at step S32, then one is added to the count C at step S33 and the count C becomes "1" at step S35, thus stop signal P "0" is output from the counter 26 at step S36. Next, steps S38 and later are executed and again the process starting at step S32 is repeated.

On the other hand, if the count C is "4" at step S32, it is reset to "0" at step S34. When the count C is determined reset to "0" at step S35, the counter 26 outputs "1" as the stop signal P at step S37.

That is, the counter 26 of the control circuit 17 counts the count C from "0" to "1" to "2" to "3" to "4" in order as the start signal ST is input.

The select signal decoder 25 assigns the select signal S to each state of the count C "1," "2," "3," and "4" based on the phase shift amount SF (S38, S39, or S41, FIG. 4). In the example, the phase shift amount SF is the phase shift count 11 (binary bit string: 1011). Thus, if the phase shift amount SF is input starting at the first bit (least significant bit), the input bit string is in the order of "1101" and the first bit of the phase shift amount SF (LSB) is "1" (FIG. 4). Therefore, the select signal decoder 25 latches the first bit of the phase shift amount SF (LSB) "1" on the clock ck (FIG. 4).

The select signal decoder 25 determines the current value of the phase shift amount SF. If the value is "1" at step S38, the select signal decoder 25 adds the count C from the counter 26 plus one (C+1) to the select signal S as a control signal and outputs the select signal S[C+1] on (1) at step S39. In the example, the first bit of the phase shift amount SF (LSB) is "1" and thus the select signal S[2] is output on (1) (FIG. 4).

Next, the selection circuit 11 selects and connects any of the combination circuits 12 to 16 based on the select signal S from the select signal decoder 25 of the control circuit 17 at step S40 or S42. In the example, the select signal S[2] is output on (1), thus the selection circuit 11 selects and connects the combination circuit 13 (matrix operation weight "1 (=$2^{1-1}$=$2^0$)") at step S40.

On the other hand, the storage clock generation circuit 27 sets the value of the register storage clock Rck to "1" and outputs the clock at the timing at which the value of "0" of the clock ck and the value of "0" of the stop signal P from the counter 26 are input (FIG. 4). The timing becomes a timing delayed by a half period of the clock ck from the output of the select signal S, as shown in FIG. 4. Therefore, after the selection circuit 11 selects any of the combination circuits 12 to 16, the data stored in the register 10 is introduced into the selected combination circuit based on the register storage clock Rck and the combination circuit performs matrix operation on the received data. The matrix operation result data is again stored in the register 10 at step S43. In the example, the selection circuit 11 selects the combination circuit 13, thus the data stored in the register 10 is introduced into the combination circuit 13, which then performs operation on the received data with matrix operation weight "1." The matrix operation result data (update data) is again stored in the register 10 at step S43.

FIGS. 5A to 5E show matrix operations performed by the combination circuits 12 to 16. FIG. 5A shows the unit matrix operation performed by the combination circuit 12; FIG. 5B shows the matrix operation with weight 1 (=$2^0$) performed by the combination circuit 13; FIG. 5C shows the matrix operation with weight 2 (=$2^1$) performed by the combination circuit 14; FIG. 5D shows the matrix operation with weight 4 (=$2^2$) performed by the combination circuit 15; and FIG. 5E shows the matrix operation with weight 8 (=$2^3$) performed by the combination circuit 16. Here, the combination circuits 14 to 16 may directly use the matrixes previously shown on the right sides of FIG. 5.

The control circuit 17 repeats the process starting at step S32 in response to the next clock ck. Likewise, in the example, the second bit of the phase shift amount SF is "1" and thus the control circuit 17 outputs the select signal S[3] on (1) at step S39. Therefore, the selection circuit 11 selects and connects the combination circuit 14 (matrix operation weight "2 (=$2^{2-1}$=$2^1$)") at step S40. The combination circuit 14 performs operation on the received data from the register 10 in response to the register storage clock Rck with matrix operation weight "2." The matrix operation result data (update data) is stored in the register 10 at step S43.

Next, the control circuit 17 repeats the process starting at step S32 in response to the next clock ck. In the example, the third bit of the phase shift amount SF is "0" and thus the control circuit 17 outputs the select signal S[1] on (1) at step S41. Therefore, the selection circuit 11 selects and connects the combination circuit 12 (unit matrix operation) at step S42. The combination circuit 12 performs matrix operation on the received data from the register 10 in response to the register storage clock Rck with the unit matrix. In this case, the matrix operation with the unit matrix is performed and thus the data is not updated. Therefore, the same data as in the register 10 is stored in the register 10 at step S43.

Next, the control circuit 17 repeats the process starting at step S32 in response to the next clock ck. In the example, the fourth bit of the phase shift amount SF is "1" and thus the control circuit 17 outputs the select signal S[5] on (1) at step S39. Therefore, the selection circuit 11 selects and connects the combination circuit 16 (matrix operation weight "8 (=$2^{4-1}$=$2^3$)") at step S40. The combination circuit 16 performs operation on the received data from the register 10 in response to the register storage clock Rck with matrix operation weight "8." The update data (matrix operation result data) is stored in the register 10 at step S43.

Last, the count C is "4", at step S32 and thus is reset to "0" at step S34, whether or not the coding processing is to be terminated is determined at step S35, and the stop signal P is output on (1) at step S37. Upon reception of the on (1) output of the stop signal P from the control circuit 17, the code generator terminates the code generation processing.

Upon completion of the described processing, the data provided by processing the initial data with the arbitrary phase shift amount SF is stored in the register 10.

The code generator and the code generation method of the invention have been described. The number of the combination circuits (matrix operation weights) may be determined appropriately in response to the shift operation count. The bit string of the phase shift amount SF may be handled starting at the most significant bit.

As shown above, according to the code generator and the code generation method of the invention, the combination circuits (matrix operation weights) are provided in response to the shift count, whereby the shift operation can be performed at high speed on a small circuit scale.

Second Embodiment

Figure 6:
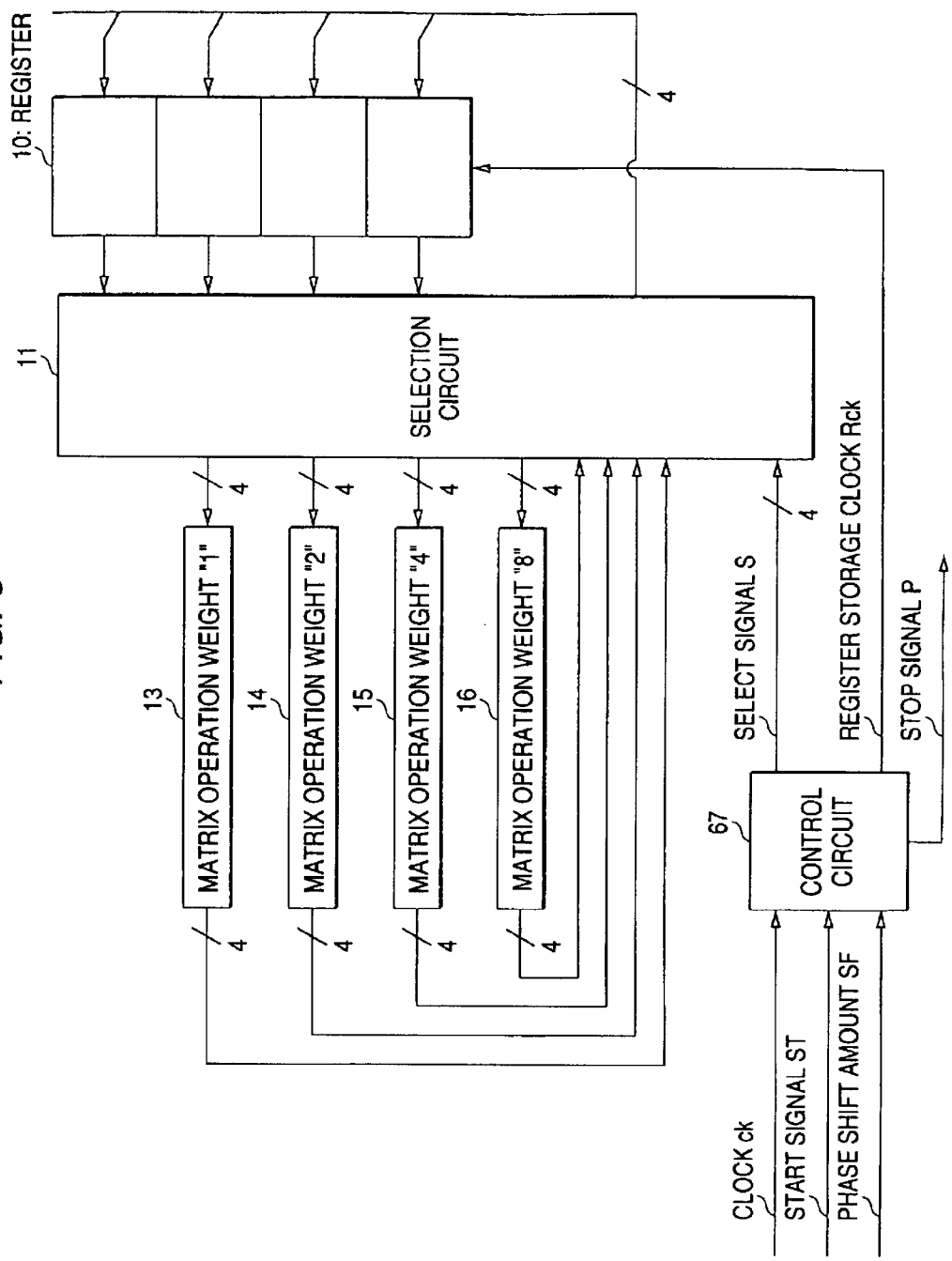
FIG. 6 is a drawing to show the configuration of a code generator in the invention.

FIG. 6 is a drawing to show the configuration of a code generator of the invention. In FIG. 1, the code generator comprises a register 10 for temporarily holding data, a selection circuit 11 for selecting data from the register 10 and determining the output destination of the data, a combination circuit 13 for performing matrix operation of shift operation "1 (=$2^0$)" (matrix operation weight "1"), a combination circuit 14 for performing matrix operation of shift operation "2 (=$2^1$)" (matrix operation weight "2"), a combination circuit 15 for performing matrix operation of shift operation "4 (=$2^2$)" (matrix operation weight "4"), a combination circuit 16 for performing matrix operation of shift operation "8 (=$2^3$)" (matrix operation weight "8"), and a control circuit 67 for controlling the timing of storing data in the selection circuit 11 and the register 10.

Figure 7:
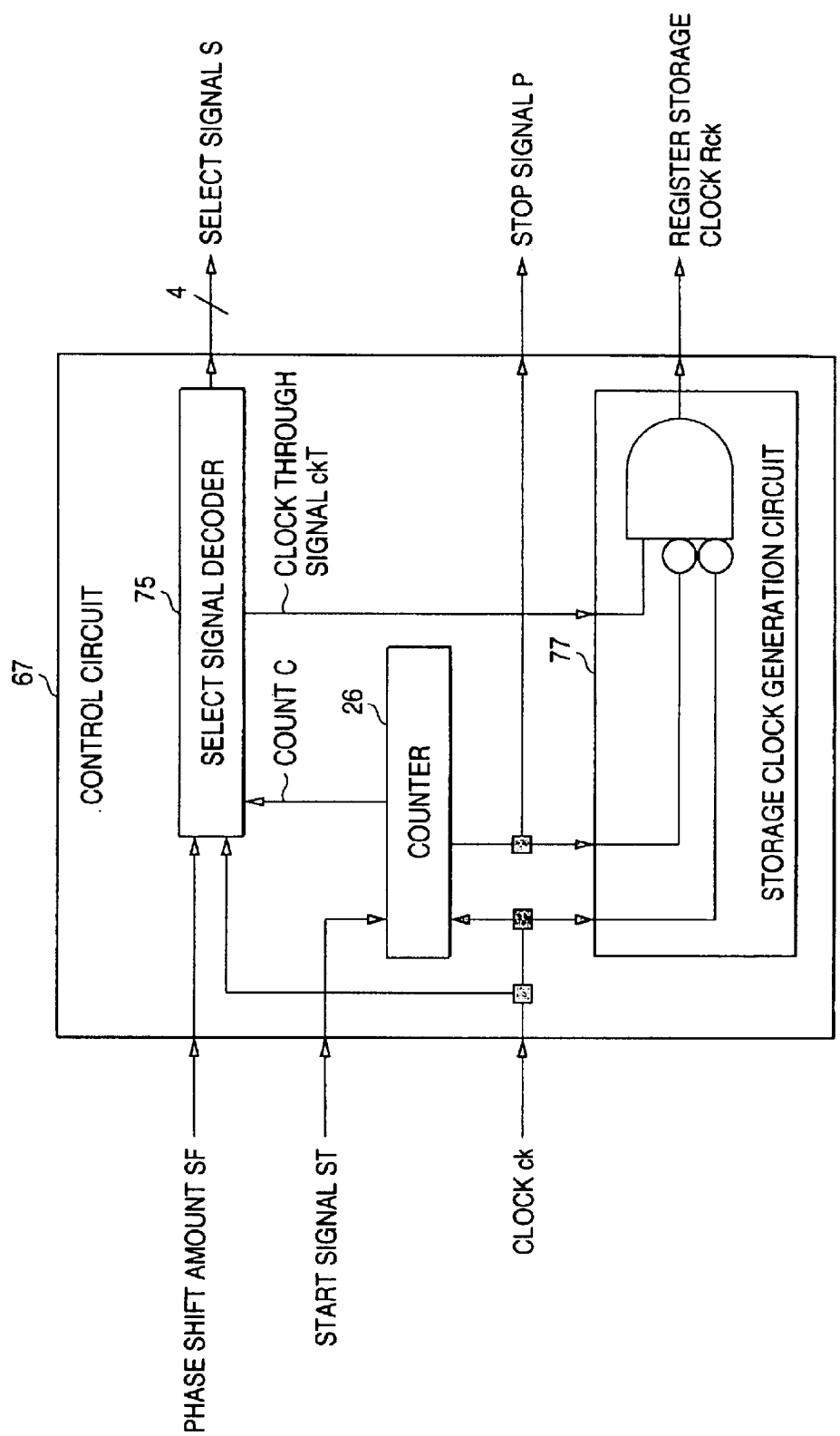
FIG. 7 is a drawing to show the configuration of a control circuit in the invention.

FIG. 7 is a drawing to show the configuration of the control circuit 67. The control circuit 67 comprises a counter 26 for counting clock ck in response to input of a start signal ST and outputting a clock ck count C and a stop signal P, a select signal decoder 75 for outputting a clock through signal ckT and a select signal S based on a phase shift amount SF, the clock ck, and the count C from the counter 26, and a storage clock generation circuit 77 for inverting the clock ck and the stop signal P from the counter 26 and outputting the logical product of the inverted clock and signal and the clock through signal ckT from the select signal decoder 75 as a register storage clock Rck.

Figure 8:
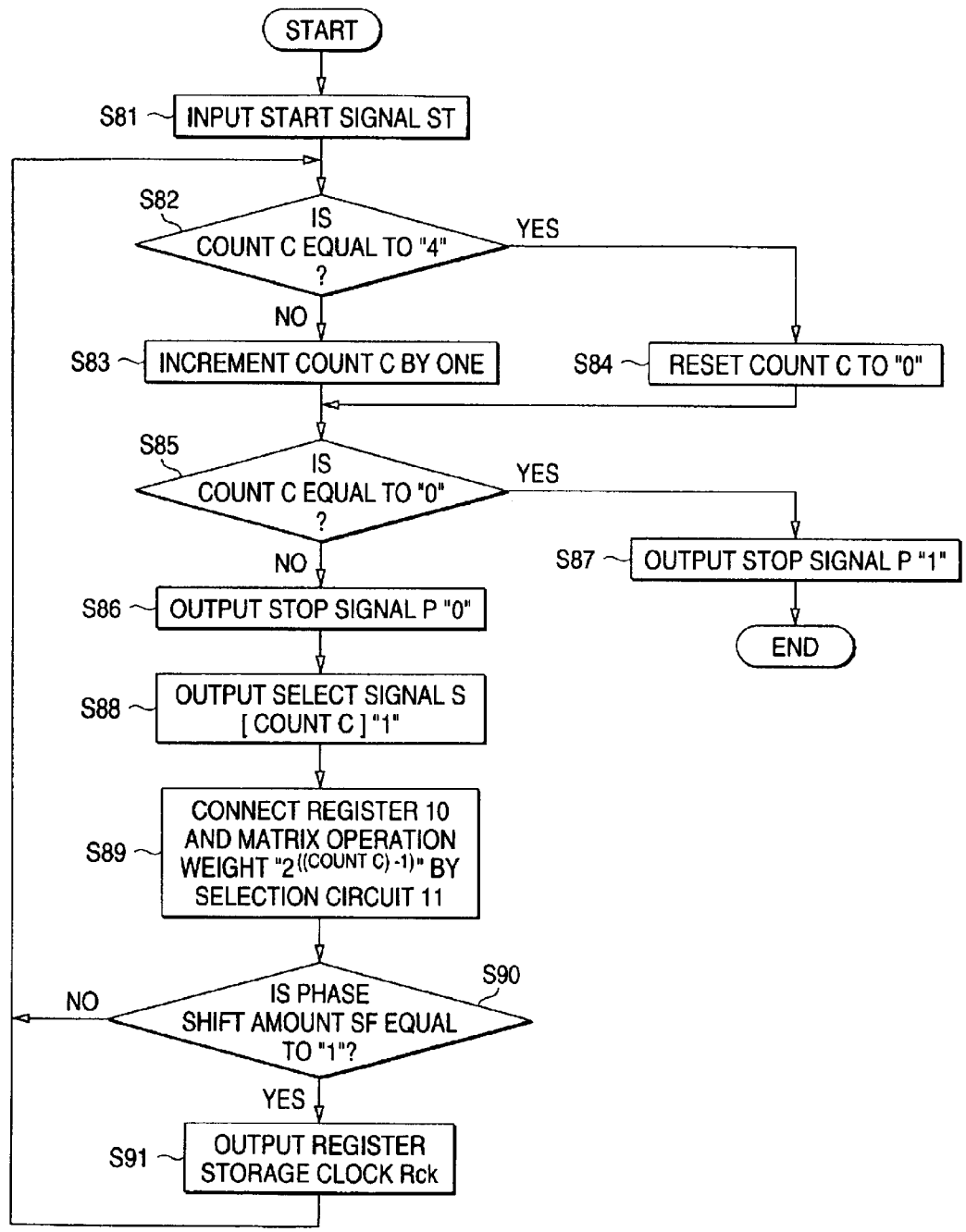
FIG. 8 is a flowchart to show the operation of the code generator in the invention.
Figure 9:
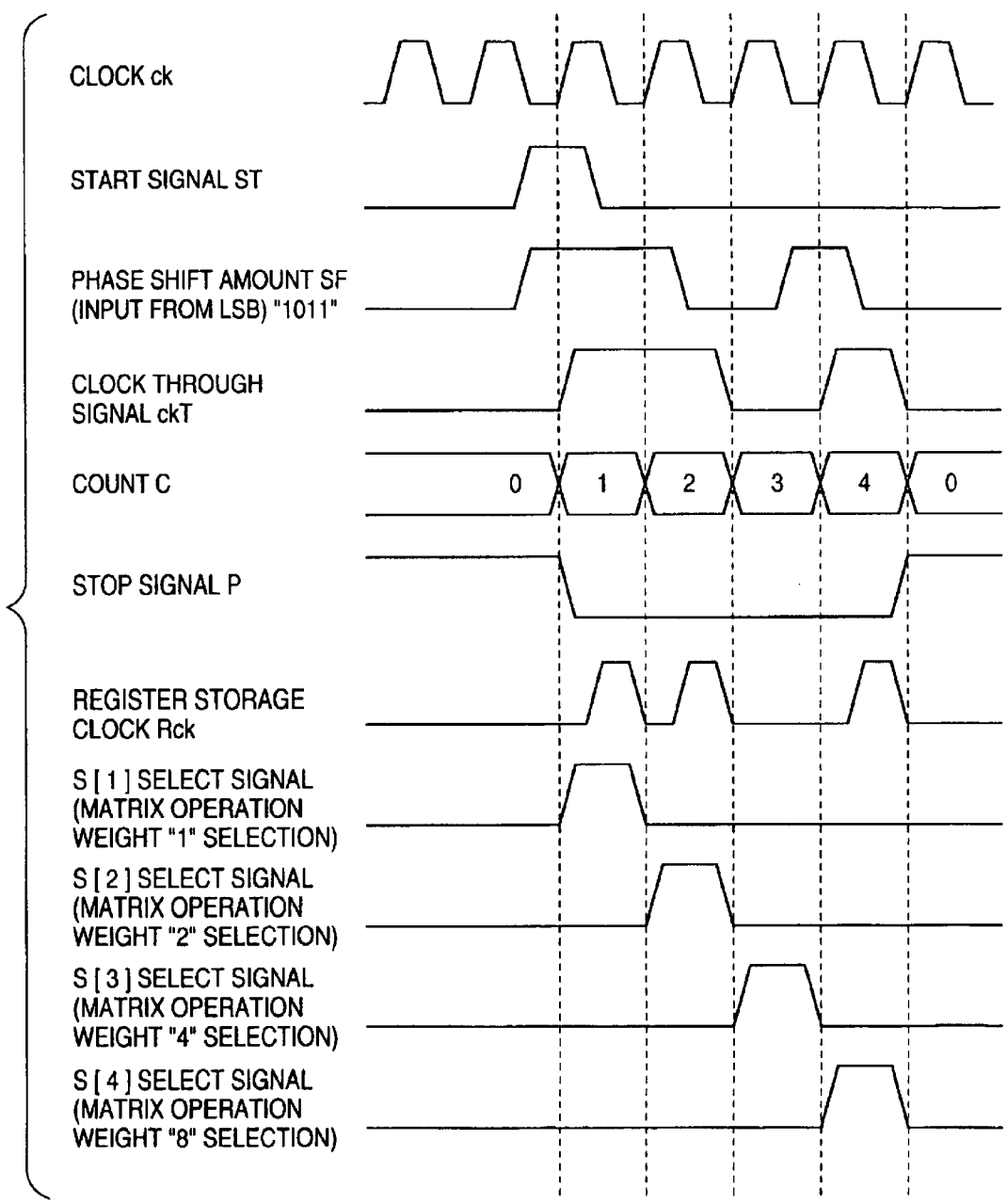
FIG. 9 is a time chart to show the operation of the code generator in the invention.

FIG. 8 is a flowchart to show the operation of the code generator previously described with reference to FIGS. 6 and 7. FIG. 9 is an operation timing chart of the code generator previously described with reference to FIGS. 6 and 7.

The operation of the code generator of the invention will be discussed. As an example of generating (outputting) a PN sequence, X4+X3+1 with degree 4 is taken, and the operation with the phase shift count 11 (binary bit string: 1011) is performed.

First, initial data is stored in the register 10. Next, a start signal ST is input to the counter 26 of the control circuit 67 at step S81.

When the start signal ST is input, the counter 26 inputs the phase shift count 11 (binary bit string: 1011) in order starting at the least significant bit of the binary number every clock ck as input of the phase shift amount SF of the control circuit 67, and outputs a stop signal P (S82–S87).

For example, the first count C of the counter 26 is "0" at step S82, then one is added to the count C at step S83 and the count C becomes "1" at step S85, thus stop signal P "0" is output from the counter 26 at step S86. Next, steps S88 and later are executed and again the process starting at step S82 is repeated.

On the other hand, if the count C is "4" at step S82, it is reset to "0" at step S84. When the count C is determined reset to "0" at step S85, the counter 26 outputs "1" as the stop signal P at step S87.

That is, the counter 26 of the control circuit 67 counts the count C from "0" to "1" to "2" to "3" to "4" in order as the start signal ST is input.

The select signal decoder 75 assigns the select signal S to each state of the count C "1," "2," "3," and "4" based on the phase shift amount SF (S88, S89, and FIG. 9). In the example, the phase shift amount SF is the phase shift count 11 (binary bit string: 1011). Thus, if the phase shift amount SF is input starting at the first bit (least significant bit), the input bit string is in the order of "1101" and the first bit of the phase shift amount SF (LSB) is "1" (FIG. 9). Therefore, the select signal decoder 75 latches the first bit of the phase shift amount SF (LSB) "1" on the clock ck (FIG. 9).

The select signal decoder 75 adds the count C from the counter 26 to the select signal S as a control signal "C" and outputs the select signal S[C] on (1) at step S88. In the example, the count C is "1" and thus the select signal S[1] is output on (1) (FIG. 9).

Next, the selection circuit 11 selects and connects any of the combination circuits 13 to 16 based on the select signal S from the select signal decoder 75 of the control circuit 67 at step S89. In the example, the select signal S[1] is output on (1), thus the selection circuit 11 selects and connects the combination circuit 13 (matrix operation weight "1 $(=2^{1-1}=2^0)$") at step S89.

The select signal decoder 75 latches the phase shift amount SF on the rising edge of the clock ck and generates a clock through signal ckT. The storage clock generation circuit 77 outputs the clock through signal ckT as the value of the register storage clock Rck at the timing at which the value of "0" of the clock ck and the value of "0" of the stop signal P from the counter 26 are input (FIG. 9). That is, the register storage clock Rck responsive to the value of the phase shift amount SF is output from the control circuit 67 to the register.

At this time, if the value of the register storage clock Rck (phase shift amount SF) is "1," data is sent from the register 10 to the selection circuit 11 at step S90. The timing becomes a timing delayed by a half period of the clock ck from the output of the select signal S as shown in FIG. 9.

Therefore, after the selection circuit 11 selects any of the combination circuits 13 to 16, the data stored in the register 10 is introduced into the selected combination circuit based on the register storage clock Rck and the combination circuit performs matrix operation on the received data (FIG. 5). The matrix operation result data (update data) is again stored in the register 10 at step S91.

On the other hand, if the value of the register storage clock Rck (phase shift amount SF) is "0," data is not sent from the register 10 to the selection circuit 11 and is held intact at step S90.

In the example, the selection circuit 11 selects the combination circuit 13 at step S89 and the value of the register storage clock Rck (phase shift amount SF) is "1" at step S90, thus the selection circuit 11 can introduce the data stored in the register 10 into the combination circuit 13. The combination circuit 13 then performs operation on the received data with matrix operation weight "1." Further, the matrix operation result data (update data) is again stored in the register 10 at step S91.

The control circuit 67 repeats the process starting at step S82 in response to the next clock ck. Likewise, in the example, the control circuit 67 outputs the select signal S[2] on (1) at step S88, and the selection circuit 11 selects and connects the combination circuit 14 (matrix operation weight "2 $(=2^{2-1}=2^1)$") at step S89. On the other hand, the second bit of the phase shift amount SF is "1," thus the value of the register storage clock Rck also becomes "1" at step S90. The combination circuit 14 performs operation on the received data from the register 10 in response to the register storage clock Rck with matrix operation weight "2." The matrix operation result data (update data) is stored in the register 10 at step S91.

Next, the control circuit 67 repeats the process starting at step S82 in response to the next clock ck. In the example, the control circuit 67 outputs the select signal S[3] on (1) at step S88, and the selection circuit 11 selects and connects the combination circuit 15 (matrix operation weight "4 $(=2^{3-1}=2^2)$") at step S89. On the other hand, the third bit of the phase shift amount SF is "0," thus the value of the register storage clock Rck also becomes "0" at step S90, and the register 10 does not output data. Thus, the same data as at the preceding clock ck timing is stored (held) intact in the register 10.

Next, the control circuit 67 repeats the process starting at step S82 in response to the next clock ck. In the example, the control circuit 67 outputs the select signal S[4] on (1) at step S88. Therefore, the selection circuit 11 selects and connects the combination circuit 16 (matrix operation weight "8 $(=2^{4-1}=2^3)$") at step S89. On the other hand, the fourth bit of the phase shift amount SF is "1," thus the value of the register storage clock Rck also becomes "1" at step S90. The combination circuit 16 performs operation on the received data from the register 10 in response to the register storage clock Rck with matrix operation weight "8." The matrix operation result data (update data) is stored in the register 10 at step S91.

Last, the count C is "4" at step S82 and thus is reset to "0" at step S84, whether or not the coding processing is to be terminated is determined at step S85, and the stop signal P is output on (1) at step S87. Upon reception of the on (1) output of the stop signal P from the control circuit 67, the code generator terminates the code generation processing.

Upon completion of the described processing, the data provided by processing the initial data with the arbitrary phase shift amount SF is stored in the register 10.

The code generator and the code generation method of the invention have been described. The number of the combination circuits (matrix operation weights) may be determined appropriately in response to the shift operation count. The bit string of the phase shift amount SF may be handled starting at the most significant bit.

As shown above, according to the code generator and the code generation method of the invention, output of the register is controlled in response to the bit of the phase shift amount, so that the shift operation can be performed at high speed on a smaller circuit scale.

Third Embodiment

Next, a communication unit using the code generator covered in the description of the first or second embodiment.

Figure 10:
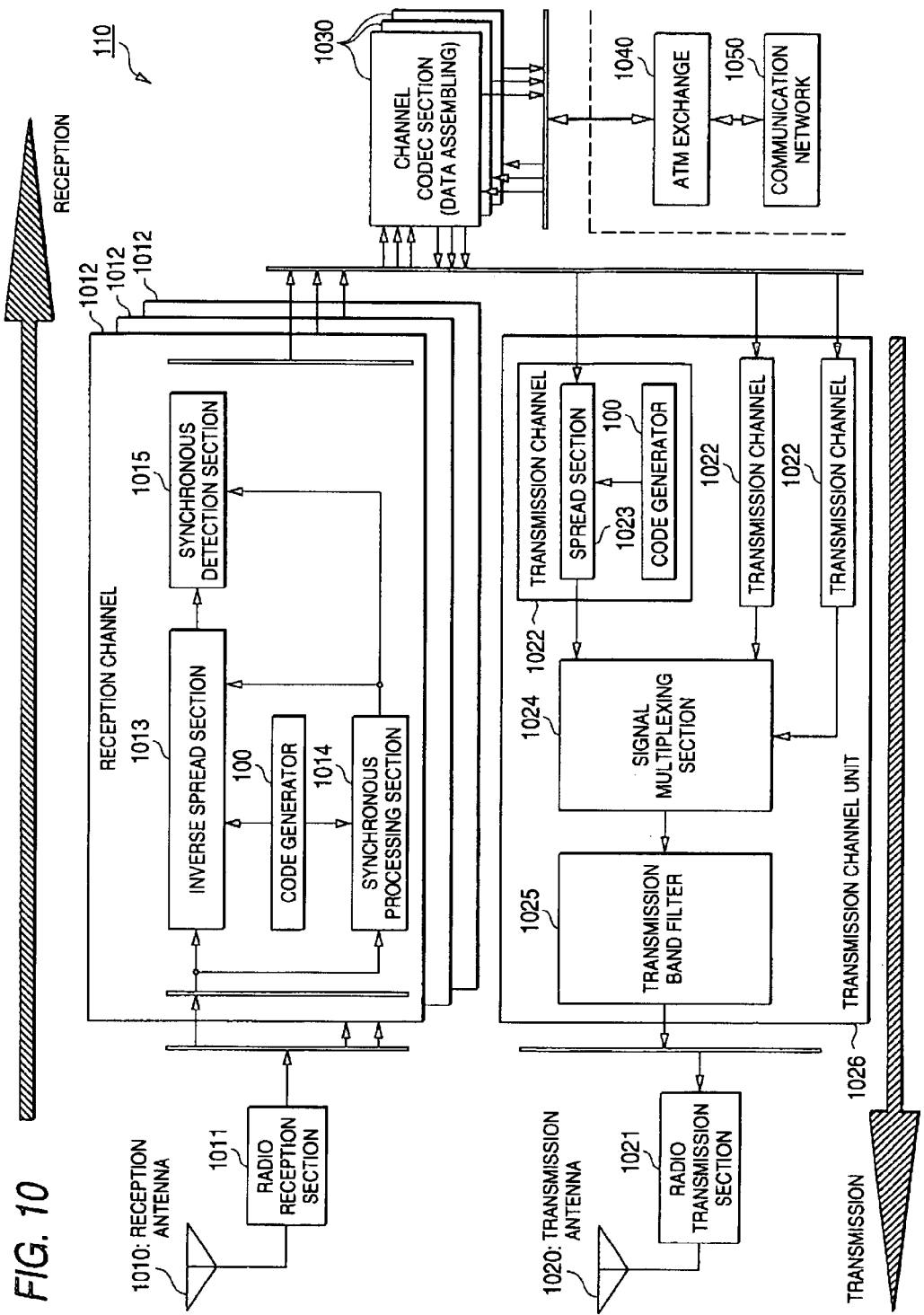
FIG. 10 is a drawing to show the configuration of a communication system and a communication unit using the code generator in the invention.
Figure 11:
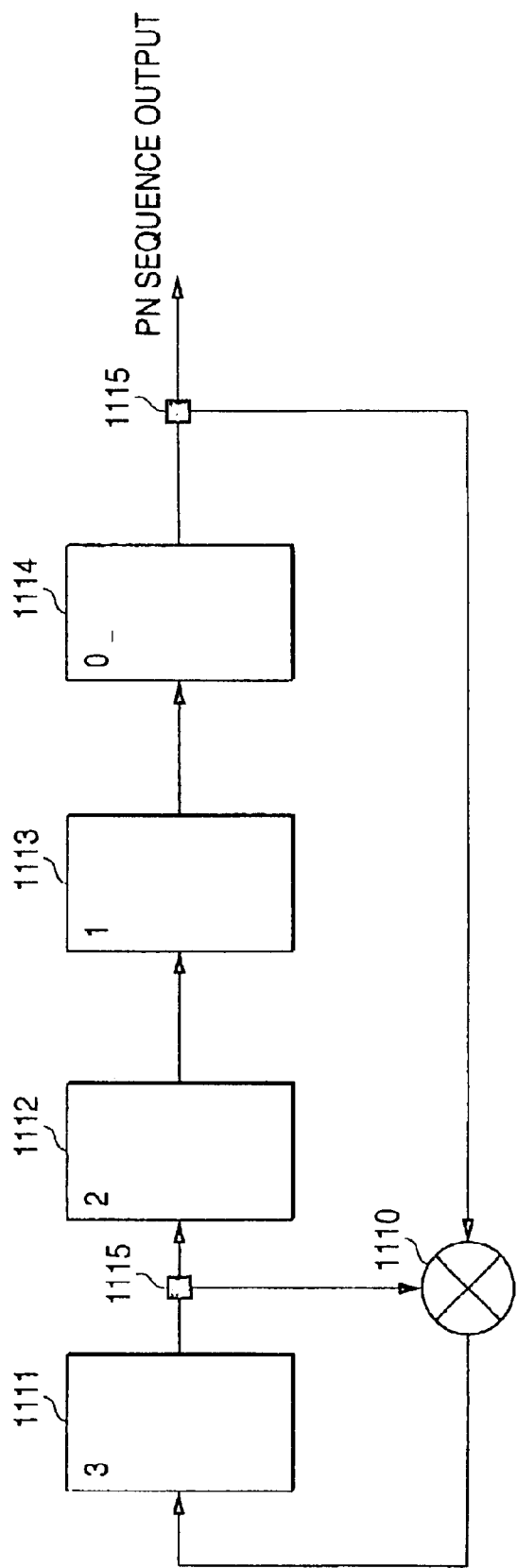
FIG. 11 is a drawing to show the configuration of a code generator in a related art.

FIG. 10 is a drawing to show a communication system including a communication unit using the code generator of the invention. In FIG. 10, a communication unit 110 comprises a reception antenna 1010 for inputting a radio signal, a radio reception section 1011 for receiving the radio signal input through the reception antenna 1010, a plurality of reception channels 1012 for receiving reception signals on each predetermined frequency band from the radio reception section 1011 and processing the signals, a channel codec section 1030 for assembling voice data, etc., from the processed reception signals and generating a signal for transmission for each predetermined frequency band from the voice data, etc., a transmission channel unit 1026 for generating a transmission signal from the signal for transmission, a radio transmission section 1021 for transmitting the transmission signal as a radio signal, and a transmission antenna 1020 for outputting the radio signal.

The channel codec section 1030 is connected to a communication network 1050 via a communication line and an ATM exchange 1040 to conduct data communications with any other communication unit.

Each reception channel 1012 comprises a code generator 100 for generating code responsive to a predetermined phase shift amount, a synchronous processing section 1014 for generating a synchronizing signal based on the code from the code generator 100 and a reception signal, an inverse spread section 1013 for inversely spreading a reception signal in response to the synchronizing signal of the synchronous processing section 1014 based on the code from the code generator 100, and a synchronous detection section 1015 for synchronously detecting the inversely spread signal based on the synchronizing signal from the synchronous processing section 1014.

The transmission channel unit 1026 comprises transmission channels 1022 for processing a signal for transmission for each frequency band, a signal multiplexing section 1024 for multiplexing the signals processed in the transmission channels 1022, and a transmission band filter 1025 for removing noise having a predetermined frequency band from the multiplexed signal to maintain the quality of the signal.

Each transmission channel 1022 comprises a code generator 100 for generating code responsive to a predetermined phase shift amount and a spread section 1023 for spreading a signal for transmission based on the code from the code generator 100.

The reception antenna 1010 and the transmission antenna 1020 can be made the same antenna. It is advisable for a pair of reception channel 1012 and transmission channel 1022 to comprise a single code generator 100. At this time, signals on the same frequency band are processed in the reception channel 1012 and the transmission channel 1022 comprising the same code generator 100.

The code generator 100 is the code generator covered in the description of the first or second embodiment.

The operation of the communication unit 110 shown in FIG. 10 is as follows: In the figure, the reception antenna 1010 inputs radio signals. Upon reception of the radio signals through the reception antenna 1010, the radio reception section 1011 classifies the radio signals into predetermined frequency band signals and sends the signals to the corresponding reception channels 1012.

Each reception channel 1012 receives the reception signal for each predetermined frequency band from the radio reception section 1011 and processes the signal as follows: The code generator 100 generates code responsive to a predetermined phase shift amount (inversely spread code). The synchronous processing section 1014 generates a synchronizing signal based on the code from the code generator 100 and the reception signal. The inverse spread section 1013 inversely spreads the reception signal in response to the synchronizing signal from the synchronous processing section 1014 based on the code from the code generator 100. The synchronous detection section 1015 synchronously detects the inversely spread signal based on the synchronizing signal from the synchronous processing section 1014.

The channel codec section 1030 assembles voice data, etc., from the signals detected in the reception channels 1012 and outputs the voice data, etc., through a loudspeaker (not shown) or the like. The channel codec section 1030 can also assemble voice data, etc., from the signals input from the communication network 1050 via the communication line and the ATM exchange 1040 and output the voice data, etc., through a loudspeaker (not shown) or the like.

On the other hand, a signal for transmission is generated for each predetermined frequency band from voice data, etc., input through a microphone (not shown) or the like. The signal can also be sent to the communication network 1050 via the communication line and the ATM exchange 1040.

The signals for transmission generated by the channel codec section 1030 are output to the transmission channels 1022 for each predetermined frequency band.

In each transmission channel 1022, the code generator 100 generates code responsive to a predetermined phase shift amount (spread code). The spread section 1023 spreads the signal for transmission based on the code from the code generator 100.

The signal multiplexing section 1024 multiplexes the signals spread in the transmission channels 1022

The transmission band filter 1025 removes noise having a predetermined frequency band from the multiplexed signal to maintain the quality of the signal. The radio transmission section 1021 transmits the transmission signal filtered through the transmission band filter 1025 as a radio signal. The transmission signal is output through the transmission antenna 1020.

As described above, the communication unit of the invention uses the code generator provided with combination circuits (matrix operation weights) in response to the shift count, so that the shift operation can be performed at high speed on a small circuit scale. Therefore, the communication unit, such as a portable telephone, can be made more compact with high performance.

As shown above, according to the code generator and the code generation method of the invention, the combination circuits (matrix operation weights) are provided in response to the shift count, whereby it is made possible to perform arbitrary phase shift amount calculation of a PN sequence at high speed on a small and compact circuit scale.

Since the communication unit of the invention uses the code generator provided with the combination circuits (matrix operation weights) in response to the shift count, the shift operation can be performed at high speed on a small circuit scale, and the communication unit can be made more compact with high performance.

What is claimed is:

1. A code generator for generating code data responsive to an arbitrary phase shift amount, said code generator comprising:
storage means for storing an initial value or an operation value of the code data;
a plurality of matrix operation means each for performing a matrix operation with a weight responsive to a predetermined phase shift amount;
selection means connected between said storage means and said plurality of matrix operation means for selecting one of said plurality of matrix operation means; and
control means for controlling said selection means and said storage means, wherein
said selection means selects one of said plurality of matrix operation means in response to a selection signal from said control means and connects the selected matrix operation means to said storage means, and further wherein
said storage means outputs the stored data in response to a storage signal from said control means.

2. A code generator as claimed in claim 1, further comprising unit matrix operation means for performing a unit matrix operation, wherein said selection means is connected between said storage means and said plurality of matrix operation means and said unit matrix operation means, and which selects one of said plurality of matrix operation means or said unit matrix operation means in response to a selection signal from said control means, and which connects the selected operation means to said storage means.

3. The code generator as claimed in claim 1 or 2 wherein said control means generates the storage signal in response to an arbitrary phase shift amount.

4. The code generator as claimed in claim 1 or 2 wherein said control means generates the selection signal in response to an arbitrary phase shift amount.

5. The code generator as claimed in claim 1 or 2 wherein said control means outputs the storage signal after outputting the selection signal.

6. The code generator as claimed in claim 1 or 2 wherein said matrix operation means performs the matrix operation with a value corresponding to a predetermined code position of a code string provided by binarizing an arbitrary phase shift amount as the matrix operation weight.

7. The code generator as claimed in claim 1 or 2 wherein said storage means comprises a plurality of storage elements each for storing one-bit data.

8. A communication unit comprising reception means for processing a reception signal and transmission means for processing a transmission signal, wherein each of said reception means and said transmission means comprises a code generator as claimed in claim 1 or 2.

9. The communication unit as claimed in claim 8 wherein a plurality of said reception means and said transmission means are provided for each predetermined frequency band of the signals to be processed and said reception means and said transmission means for processing the signals on the same frequency band use the same code generator.

10. A communication system using a communication unit as claimed in claim 8 for transmitting and receiving data.

11. A code generation method for generating code data responsive to an arbitrary phase shift amount, said code generation method comprising the steps of:
storing data;
executing a count in response to the number of clocks;
selecting one bit of a binary bit string of the arbitrary phase shift amount in order starting at the least or most significant bit for each count;
generating a selection signal in response to the value of the selected bit;
performing matrix operation responsive to the selection signal on the stored data; and
replacing the stored data with the operation result data.

12. A code generation method for generating code data responsive to an arbitrary phase shift amount, said code generation method comprising the steps of:
storing data;
executing a count in response to the number of clocks;
selecting one bit of a binary bit string of the arbitrary phase shift amount in order starting at the least or most significant bit for each count;
generating a selection signal and a storage signal in response to the value of the selected bit;
determining matrix operation responsive to the selection signal;
determining whether or not the matrix operation responsive to the selection signal is to be performed on the stored data based on the storage signal; and if the matrix operation is performed on the data,
replacing the stored data with the operation result data.

13. The code generation method as claimed in claim 11 or 12 wherein said steps of said step of executing a count in response to the number of clocks to said step of replacing the stored data with the operation result data are repeated until processing is performed for all bits of the binary bit string of the arbitrary phase shift amount.

14. A code generator for generating code data responsive to an arbitrary phase shift amount, said code generator comprising:
memory for storing an initial value or an operation value of the code data;
a plurality of combination circuits each for performing a matrix operation with a different weight;
a selection circuit connected between said memory and said plurality of combination circuits for selecting one of said combination circuits based on a phase shift amount; and
a controller for controlling said selection circuit and said memory, wherein
said selection circuit selects one of said plurality of combination circuits in response to a selection signal from said controller and connects the selected combination circuit to said memory, and further wherein
said memory outputs the stored data in response to a storage signal from said controller.

* * * * *